(12) United States Patent
Venneker et al.

(10) Patent No.: US 12,144,292 B2
(45) Date of Patent: *Nov. 19, 2024

(54) HYBRID GRASS SUPPORT STRUCTURE WITH STONE WOOL LAYER

(71) Applicant: Hydrofields bv, Schiedam (NL)

(72) Inventors: Rob Venneker, Vienna (AT); Gert-Jan De Koning, Krimpen aan der Ijssel (NL)

(73) Assignee: HYDROFIELDS BV (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/347,415

(22) Filed: Jul. 5, 2023

(65) Prior Publication Data

US 2023/0337598 A1 Oct. 26, 2023

Related U.S. Application Data

(62) Division of application No. 17/270,365, filed as application No. PCT/EP2019/072120 on Aug. 19, 2019, now Pat. No. 11,849,678.

(30) Foreign Application Priority Data

Aug. 21, 2018 (EP) .................................... 18190081
Sep. 11, 2018 (EP) .................................... 18193902

(51) Int. Cl.
*A01G 24/18* (2018.01)
*A01G 9/033* (2018.01)
(Continued)

(52) U.S. Cl.
CPC ............. *A01G 20/20* (2018.02); *A01G 9/033* (2018.02); *A01G 20/10* (2018.02); *A01G 24/18* (2018.02);
(Continued)

(58) Field of Classification Search
CPC ........ A01G 20/20; A01G 20/00; A01G 20/10; A01G 24/46; A01G 24/18; E01C 2013/086
See application file for complete search history.

(56) References Cited

U.S. PATENT DOCUMENTS 5,489,317 A 2/1996 Bergevin
5,586,408 A * 12/1996 Bergevin .............. E01C 13/083
47/1.01 R
(Continued)

FOREIGN PATENT DOCUMENTS

DE 3816865 A1 5/1988
EA 19189 B1 1/2014
(Continued)

OTHER PUBLICATIONS

EP 0354748 A1 (Year: 1990).*
(Continued)

*Primary Examiner* — Kristen C Hayes
(74) *Attorney, Agent, or Firm* — Farber LLC

(57) ABSTRACT

A hybrid grass support structure (100, 200, 300, 400, 500, 600, 710) comprising a growth medium layer (102), a stone wool layer (104) positioned below the growth medium layer,
(Continued)

and a plurality of synthetic grass fibers (106). The growth medium layer comprises a growth medium. The synthetic grass fibers are incorporated at least into the growth medium layer.

13 Claims, 6 Drawing Sheets

(51) Int. Cl.
    *A01G 20/10*     (2018.01)
    *A01G 20/20*     (2018.01)
    *A01G 24/46*     (2018.01)
    *E01C 13/08*     (2006.01)

(52) U.S. Cl.
    CPC ........ *A01G 24/46* (2018.02); *E01C 2013/086* (2013.01)

(56) References Cited

U.S. PATENT DOCUMENTS

| | | | | |
|---|---|---|---|---|
| 6,029,397 | A * | 2/2000 | Motz | E01C 13/083 428/17 |
| 6,035,577 | A * | 3/2000 | Motz | A01G 20/20 428/17 |
| 6,094,860 | A | 8/2000 | Motz et al. | |
| 6,219,965 | B1 * | 4/2001 | Ishikawa | A01G 20/20 428/95 |
| 6,250,010 | B1 * | 6/2001 | Behrens | A01G 20/20 47/65.9 |
| 7,334,376 | B1 * | 2/2008 | Behrens | A01G 20/20 52/750 |
| 10,604,900 | B2 * | 3/2020 | Sarris | A01G 20/00 |
| 11,219,168 | B1 * | 1/2022 | Dennin | A01G 9/029 |
| 2015/0033626 | A1 * | 2/2015 | Sutherland | A01G 20/20 47/1.01 F |

FOREIGN PATENT DOCUMENTS

| | | | |
|---|---|---|---|
| EP | 0354748 A1 * | 2/1990 | |
| EP | 2494109 A1 | 9/2012 | |
| EP | 2734033 A1 | 5/2014 | |
| FR | 2877956 A1 | 5/2006 | |
| FR | 2932196 A1 | 11/2009 | |
| GB | 2288306 A | 10/1995 | |
| NL | 1013987 C2 | 7/2001 | |
| RU | 2517280 C2 | 5/2004 | |
| RU | 2234207 C2 | 8/2004 | |
| RU | 2369681 C2 | 10/2009 | |
| RU | 2628794 C1 | 8/2017 | |
| WO | WO 2014/029873 A1 | 2/2014 | |

OTHER PUBLICATIONS

European Patent Office; International Search Report and Written Opinion; PCT/EP2019/072120; Dec. 13, 2019 (Dec. 13, 2019).
International Bureau of WIPO; International Preliminary Report on Patentability; PCT/EP2019/072120; Mar. 4, 2021.
IP Australia; Examination Report; Patent Application No. 2019323640; Aug. 20, 2021.
Federal Service on Intellectual Property; Federal State Budgetary Enterprise "Federal Institute of Industrial Property" (FIPS) Search Report; Application Registration No. 2021106360/03(013737) Sep. 15, 2021 (Sep. 15, 2021).
Federal Service on Intellectual Property; Federal State Budgetary Enterprise "Federal Institute of Industrial Property" (FIPS) Decision on Grant; Application Registration No. 2021106360/03(013737) Oct. 1, 2021 (Oct. 1, 2021).

* cited by examiner

TUFTING

Injection

HYBRID GRASS SUPPORT STRUCTURE WITH STONE WOOL LAYER

CROSS-REFERENCE TO RELATED APPLICATIONS

This application is a Divisional application of U.S. application Ser. No. 17/270,365, filed Feb. 22, 2021 which is a National Phase of PCT/EP2019/072120, filed Aug. 19, 2019, which claims benefit of EP Application No. 18 190 081.2, filed Aug. 21, 2018 and EP Application No. 18 193 902.6, filed Sep. 11, 2018, the complete disclosures of which are incorporated herein by reference in their entirety for all purposes.

TECHNICAL FIELD

The invention relates to the hybrid grass, and more specifically, to hybrid grass support structures and the installation of hybrid grass support structures.

BACKGROUND

For years, natural grass or turf surfaces were used for most outdoor sports. Natural turf surfaces are surfaces constructed with grass grown in soil, or some other surface material (e.g., sand, sand and organic mixes), constructed upon a suitable foundation.

Natural turf surfaces are sometimes preferred for their comfort, feel, grip, and appearance. However, under heavy use and/or poor weather conditions, natural turf surfaces deteriorate rapidly, and maintenance is costly. Intense activity on the turf destroys the turf and the root system, leaving mud and/or dirt as the playing surface. Until the field is reestablished, the degraded natural turf surface can be unattractive and possibly even hazardous to use.

Artificial turf surfaces have been used as an alternative to natural turf surfaces. Artificial turfs are a class of polymer-based floor textiles that imitate natural grass in their visual appearance and physical properties. They are normally manufactured from synthetic fibers that are fixed to a synthetic carpet background. The synthetic fibers imitate natural grass blades and are formed from one or more extruded monofilaments. Mono- or bi-component monofilaments are known from the state of the art to be used as basic materials for the production of artificial turf fibers. Artificial grass surfaces require less maintenance and withstand more intensive use than natural turfs.

Although synthetic turf surfaces are more durable and easier to maintain than natural turf surfaces, some synthetic turfs also have disadvantages, in particular their tendency to overheat in the direct sun, the unnatural traction they create, and their tendency to cause friction burns.

Hybrid turf combines the advantages of both types of turf. However, some prior art hybrid turf types also have disadvantages. In particular, hybrid turf surfaces are often difficult to transport and install and tend to clog when the roots of the natural grass fibers grow and form a tight mesh or matrix with the synthetic fibers. The growth of the natural grass plants is sometimes hampered by the presence of the synthetic fibers and/or the layer, so-called backing material, into which the synthetic fibers are tufted.

U.S. Pat. No. 6,094,860 A describes a stabilized turf particularly suitable for athletic fields that includes a mat interposed between upper and lower layers of growth media. The mat has a horizontally disposed, biodegradable primary backing and generally upwardly extending fibers secured thereto, wherein the fibers extend above the upper layer of growth media. Natural grass plants extend upwardly above the upper layer, with the roots extending down through the backing and into the lower layer. The mat stabilizes root growth, particularly during initial growing.

SUMMARY

The invention provides for a hybrid grass support structure, methods for installing a hybrid grass support structure, and a box comprising a hybrid grass support structure as specified in the independent claims. Embodiments of the invention are given in the dependent claims. Embodiments and examples described herein can freely be combined with each other as long as they are not mutually exclusive.

In one aspect, the invention relates to a hybrid grass support structure comprising a growth medium layer, a stone wool layer positioned below the growth medium layer, and a plurality of synthetic grass fibers. The growth medium layer comprises a growth medium. The synthetic grass fibers (or simply "synthetic fibers") are incorporated at least into the growth medium layer and into the stone wool layer.

Providing a hybrid grass support structure comprising a stone wool layer may have the advantage that this layer promotes plant growth and provides elasticity as well as resilience to the hybrid grass. Stone wool tends to slowly degrade over many years of use and repeated contact with water, sunlight, and mechanical stress. Thereby, minerals are continuously released, which promotes plant growth. This may reduce the necessity to add artificial plant fertilizer and reduce costs and effort involved with maintaining hybrid grass.

Furthermore, stone wool is able to absorb and store large amounts of water (relative to the weight and volume of the stone wool). The water is continuously and slowly released so that the roots of the natural grass plants are constantly provided with water. Thereby, waterlogging, which may lead to a rotting of the roots and other plant parts, is avoided. Stone wool can hold large quantities of water that aid root growth and nutrient uptake. The fibrous nature of stone wool provides a good mechanical structure to keep the grass plants stable. Hence, the stone wool layer may act as a buffering reservoir of water in the root zone while maintaining an adequate volume of air (oxygen) in contact with the roots. This reservoir of nutrient solution is available even when the irrigation system is off for periods of time. Plants grown in stone wool are not exposed to water stress until the stone wool is almost completely dry.

In a further beneficial aspect, it has been observed that stone wool layers are sufficiently rigid to prevent the feet of the players from sinking too deep into the ground. Floor coverings, which are very soft, are often considered unsuitable for many types of sports, because a deep sinking of the feet into the ground means an additional, considerable effort for the players when running. It is assumed that the strong intertwining of the individual stone wool fibers provides a degree of rigidity to the stone wool layer that is desirable in many types of sports, such as soccer, American football, baseball, and the like. Nevertheless, a stone wool layer provides sufficient elasticity to the hybrid turf to minimize the risk on injuries of the players' joints. In a further beneficial aspect, stone wool is a material that can maintain its structure and water-bearing capability over a long period of time and is not degraded by microorganisms.

That the synthetic grass fibers are incorporated in the growth medium and into the stone wool layer may be beneficial as the synthetic fibers are fixed in the artificial turf structure more firmly and more reliably, thereby also improving the mechanical support provided to the natural grass plants. Stone wool is a material that can maintain its structure over a long period of time and the tight mesh formed by the stone wool fibers have been observed to provide a stronger mechanical support for the artificial fibers than even thick layers of growth media as the loose, granular form of the growth medium is often not able to sufficiently fix the synthetic fibers in case the fibers are subjected to strong mechanical forces occurring e.g. in soccer or rugby games. Incorporating the fibers into at least parts (portions, upper regions) of the stone wool layer has the effect that the robustness of the fibers against tuft withdrawal forces is increased and/or that the height of the growth medium layer necessary for achieving the desired degree of robustness against said tuft withdrawal forces can be reduced, thereby saving material costs associated with the growth medium.

Stone wool can be manufactured by melting rock, in particular basaltic rock, and spinning the melted rock into fibers. Immediately following this spinning, a binder is added to the fibers, and they are compressed and cured into stone wool slabs. The naturally high pH of some stone wool makes it initially unsuitable for plant growth. These types of stone wool are "conditioned" to produce a wool with an appropriate pH level.

According to embodiments, the stone wool is chosen such that the stone wool layer, when allowed to drain by gravitational pull, contains about 75%-85% water or a water-based mineral solution by volume, 11%-19% air space, and about 2-14%, preferably 5% stone wool fibers. This ratio of solution to air has been observed to strongly promote root growth. Plants growing on stone wool will remove solution and increase the ratio of air space to solution. Thus, if a higher proportion of air is desired in the root zone, increasing the time between watering will increase the percentage of air. Hence, the use of stone wool may provide greater control of the growth rate of the natural grass plants.

According to embodiments, the growth medium is selected from a group comprising sand, soil, an organic granulate, and a mixture of two or more of the foregoing.

Using the above-mentioned materials may be beneficial because they are cheap, loose, and have good drainage capabilities. The materials allow integrating synthetic fibers into the growth medium layer and allow the roots of natural grass plants to grow between the grains of the growth medium and the synthetic fibers, thereby forming a mechanically stable mesh of fibers and roots.

According to embodiments, the growth medium layer also contains grass seed.

In some embodiments, the hybrid grass support structure is fabricated in a factory, e.g., in the form of a support mat or in the form of small hybrid grass support tiles.

Each of the tiles is put into a biodegradable box. The grass seed can be intermixed with the growth medium before the growth medium is added on top of the stone wool layer in the factory. Alternatively, the grass seed can be added on top of the growth medium layer after the growth medium layer has been added on top of the stone wool layer in the factory. According to still other embodiments, the hybrid grass support structure is manufactured in the factory without grass seed. In this case, the hybrid grass support structure is free of the grass seed. The support structure is installed at the use site (e.g., by unrolling or installing a hybrid grass support structure roll on the use site or by placing a plurality of the above-mentioned boxes next to each other at the use site), and the seeds are added afterward. For example, the seeds can be spread manually or by a seeding machine on top of the growth medium layer of the installed hybrid grass support structure.

According to preferred embodiments, the box is a transport box with handles, wall openings, or other elements that allow one or more persons or a machine to grip, transport, and handle the box.

Preferably, the box is sized and shaped such that it is portable by two people, or better yet, by a single person.

According to further embodiments, the boxes are shaped as modules for forming a closed surface when arranged adjacent to a plurality of other boxes. For example, the boxes can have a rectangular or square base or can have elevations and recesses that provides for a positive-locking positioning of the boxes next to each other. Putting a plurality of the boxes next to each other results in the creation of a grid of boxes that is substantially free of gaps. When the walls of the boxes have degraded and the grass plants have reached a certain size, a homogeneous hybrid turf is formed that does not comprise any visible element being indicative of the grid of boxes used for creating the hybrid turf.

According to preferred embodiments, at least two opposing walls of each box have elevations and/or recessions that are formed such that two boxes can be placed adjacent to each other and are positively connected.

For example, an elevation on the front can face a depression opposite it, the depression corresponding to the elevation in position and size. This design allows two boxes to be positively (positive-locking) positioned next to each other so that they cannot slip relative to each other. For example, the elevation on the front of a first box can fit exactly into the recess on the back of a second box, and the second box can be positioned so that its back is in direct contact with the front of the first box.

According to embodiments, the stone wool is made from basalt.

[According to preferred embodiments, the stone wool is made from pure basaltic rock. This may be advantageous, as this particular type of stone wool has a mineral balance that is inert and nonreactive, and is particularly adapted to promote plant growth.

According to embodiments, the growth medium layer comprises natural grass plant roots. Typically, the hybrid grass support structure is free of the grass roots when installed at the use site. However, the support structure manufactured at a factory comprises grass seed within or on top of the growth medium layer, which is supplemented with grass seed at the use site after installation. When the installed hybrid grass support structure is irrigated repeatedly or is repeatedly exposed to rain, the seeds germinate, and the natural grass fibers and roots start to grow.

According to embodiments, the synthetic grass fibers are incorporated into at least the growth medium layer by injecting the synthetic grass fibers into at least the growth medium layer.

According to other embodiments, the synthetic grass fibers are incorporated into at least the growth medium layer by tufting the synthetic grass fibers into at least the growth medium layer. For example, the synthetic fibers can be tufted with a tufting machine at a factory for providing a hybrid grass support structure that is installed at the use site.

According to still other embodiments, the synthetic grass fibers are incorporated into at least the growth medium layer by mixing the synthetic grass fibers with the growth medium. For example, the mixing can be performed at the use site or can be performed at the manufacturing plant, e.g., by a machine that intermixes the growth medium layer contained in a biodegradable box with synthetic fibers such that the fibers extend from the growth medium layer in a basically vertical direction.

According to still other embodiments, the synthetic fibers are provided in the form of fibers in a synthetic fiber mat. This embodiment may be used for installing a hybrid grass support structure on a large area, e.g., a large football field, because the mat can be transported in the form of a roll that can be easily installed.

To keep the fibers in an upright position, the mat can be fabricated by interweaving the synthetic grass fibers such that they form the mat or by tufting the synthetic grass fibers into a carrier mesh.

According to embodiments, the stone wool layer has a height of at least 0.3 cm. According to some embodiments, the stone wool layer has a height in the range of 3 to 10 cm, preferably in the range of 5 to 10 cm. The above-mentioned height ranges have been observed to provide a degree of elasticity as well as rigidity that is desirable for many types of sports, because on the one hand, the resilience prevents the feet of the players from sinking too deeply into the ground, and on the other hand, the elasticity minimizes the risk on injuries of the joints of the players.

According to embodiments, the growth medium layer has a height of at least 5 cm, preferably in the range of 6 to 35 cm, more preferably in the range of 15 to 25 cm.

This may be advantageous, because a large height of the growth medium layer ensures that the fibers are firmly integrated into the support structure even when they are integrated only via injection, not via tufting or knitting.

According to embodiments, the growth medium layer has a height of less than 7 cm, in some embodiments less than 6 cm, in some embodiments less than 5 cm, in some embodiments less than 4 cm, in some embodiments less than 3 cm, and in some embodiments less than 2 cm. Applicant has observed that the integration of the synthetic fibers also into the stone wool layer significantly improves the fixation of the synthetic fibers in the hybrid grass support structure. Hence, the height of the growth medium layer may be reduced without risking that the mechanical stability of the hybrid grass deteriorates, thereby saving material and costs.

According to embodiments, the growth medium layer comprises a binding agent. For example, the biodegradable binding agent can be a plant-based binding agent.

Preferably, the binding agent is a biodegradable binding agent. The binding agent can be, for example, lignin, cellulose fibers, natural grass fibers, wood fibers or a mixture thereof, in particular a mixture of lignin with either natural grass fibers or wood fibers. Preferably, the binder, e.g. lignin, is contained in the growth medium in an amount of at least 3% by weight of the growth medium. For example, about 8% by weight of the growth medium can consist of the binder, e.g. lignin.

This may have the advantageous effect of stabilizing the growth medium layer, specifically during transport. The user of plant-based binding agents may have the advantage that this type of binding agent is common in nature in the hard types of biomass and has the specific property to stabilize and strengthen cellulose in the cell wall of biomass.

According to embodiments, the hybrid grass support structure further comprises a drainage layer below the stone wool layer. The drainage layer can be layered immediately below the growth medium layer. Alternatively, there can be one or more other layers between the drainage layer and the growth medium layer. The drainage layer can be, for example, a perforated layer and/or a tilted layer.

According to some embodiments, the drainage layer is a plastic layer comprising drainage holes. Alternatively, the drainage layer is a tilted plastic layer (which may or may not comprise additional drainage holes). Preferably, the drainage layer comprises one or more drainpipes adapted to guide drainage water through the openings contained in the perforated drainage layer or through a drainage channel collecting water from the tilted drainage layer to the lower side of the hybrid grass support structure. Preferably, the one or more pipes respectively comprise a further opening that is connectable to a drainage system that is already installed at the use site.

In addition, or alternatively, the hybrid grass support structure, according to some embodiments, also contains an elastic layer below the stone wool layer or between the growth medium layer and the stone wool layer. The elastic layer can be made, for example, from polyurethane or a polyurethane mixture comprising rubber granulates or other elastic granulates. The elastic layer is permeable for water and/or allows roots to penetrate the elastic layer.

According to embodiments, the plurality of synthetic grass fibers is also incorporated into the stone wool layer.

For example, the fibers can be tufted or injected into the support structure such that they selectively penetrate the upper parts of the stone wool layer or completely penetrate the stone wool layer.

Integrating the synthetic fibers into at least parts of the stone wool layer (e.g. the upper half or the complete height of the stone wool layer) may be beneficial, because it ensures the fibers are firmly fixed into the hybrid grass support structure. The growth medium, e.g., sand, is typically a loose, fine-granular medium, so it may be necessary to use a high growth medium layer in order to provide sufficient robustness against tuft withdrawal forces that typically act on the fibers. To the contrary, the stone wool layer consists of a tight mesh of fibers that provide a strong grip for the incorporated synthetic fibers. Hence, incorporating the fibers into at least parts (portions, upper regions) of the stone wool layer has the effect that the robustness of the fibers against tuft withdrawal forces is increased and/or that the height of the growth medium layer necessary for achieving the desired degree of robustness against said tuft withdrawal forces can be reduced, thereby saving material costs associated with the growth medium.

In a further aspect, the invention relates to a method of installing a hybrid grass support structure at a use site. The method comprises applying a layer of stone wool on the ground at the use site; applying a growth medium onto the applied stone wool layer for providing a growth medium layer; and incorporating a plurality of synthetic grass fibers at least into the growth medium layer and into the stone wool layer.

The ground at the use site can be, for example, soil, concrete, wood, or the like. The ground can also be an elastic layer that was installed on top of a base consisting of soil, concrete, wood, or the like. Preferably, neither the ground nor the hybrid grass support structure comprises an additional elastic layer, because the stone wool layer in combination with the growth medium layer already provides for sufficient elasticity to minimize the risk on injuries of the players.

In a further aspect, the invention relates to a box made of a biodegradable material. The box comprises the hybrid grass support structure described herein for embodiments or examples of the invention.

This may be beneficial, because the installation of hybrid turf according to prior art approaches often involves the use of large, heavy machines for injecting the synthetic fibers into the soil at the use site. This may preclude the installation of hybrid turfs for landscaping applications or sports fields where only a comparatively small area, e.g., a few square meters, is to be covered by hybrid grass. Providing the hybrid grass support structure in the form of small pieces delivered within degradable boxes makes it possible to install the hybrid grass support structure very quickly and without using heavy fiber-injection machines. The boxes are simply placed side by side in the area where the hybrid grass support structure is to be installed. Thereby, the hybrid grass support structure pieces are not removed from their boxes. Rather, the area that is now covered with the plurality of boxes is exposed to rain or effectively irrigated. The repeated contact with water and omnipresent microorganisms will result in the rapid degradation of the boxes. In addition, the water will trigger the germination and growth of the natural grass plants. Hence, after some weeks, the tiled area of boxes will have transformed into a homogeneous hybrid grass field that is basically free of the degradable walls of the boxes.

According to embodiments, the biodegradable material is cardboard.

This may be beneficial, because cardboard is cheap, mechanically stable (allows the fabrication of stackable boxes), and completely biodegradable provided it is free of any foils or parts made of nondegradable materials such as plastics. After the recycled material has broken down it becomes part of the growth medium layer, supporting the growth of natural turf and reinforcing natural turf as well.

According to embodiments, the biodegradable material is made of recycling material, e.g. cardboard made from recycled cardboard or paper.

According to embodiments, the box is stackable with boxes of the same type. For example, the boxes can comprise stiffened elements, e.g., stiffened stripes at the corners, which provide the necessary mechanical stability and durability for enabling the stacking of at least five, preferably at least 10, more preferably at least 20 boxes.

This may be beneficial, because it eases the transport and handling of the hybrid grass support structure during the transport from the manufacturing plant to the use site.

According to embodiments, the box has a base surface size smaller than 1 square meter.

This may be advantageous, because small pieces of the hybrid grass support structures and respective boxes facilitate the installation of hybrid grass support structures on small areas of only a few square meters and/or on areas with a complex, irregular outline.

In a further aspect, the invention relates to a hybrid grass comprising or consisting of a tiled area of boxes. Each box is made of a biodegradable material and comprises a hybrid grass support structure.

In a further aspect, the invention relates to a hybrid grass support structure comprising or consisting of a tiled area of boxes. Each box is made of a biodegradable material and comprises a part (i.e., the part of the hybrid grass support structure contained within one of the boxes and hence corresponding to one of the tiles) of the hybrid grass support structure. Each of the boxes may or may not comprise a stone wool layer.

According to embodiments, the hybrid grass support structure in addition comprises natural grass plants and/or seeds of natural grass plants. In this case, a hybrid grass is provided comprising or consisting of a tiled area of boxes, wherein each box is made of a biodegradable material and comprises a part of the hybrid grass support structure and some of the natural grass plants and/or seeds.

According to preferred embodiments, each of the boxes contained in the tiled area of boxes is a box comprising a stone wool layer as described herein for embodiments of the invention.

In a further aspect, the invention relates to a method of installing a hybrid grass support structure at a use site. The method comprises positioning a plurality of boxes described herein for embodiments of the invention next to each other such that an area of adjacent tiles is formed, each tile being one of the boxes. Then, the boxes are allowed to degrade. For example, the boxes can be exposed to rain and/or can be irrigated regularly. The hybrid grass support structure contained in the individual boxes may already contain natural grass seed within or on top of the growth medium layer. Alternatively, the seed is added at the use site before or after the boxes are placed on their allocated space.

According to embodiments, the method comprises growing natural grass plants in the installed hybrid grass support structure to provide a hybrid turf.

The term "stone wool" as used herein refers to a man-made mineral fiber. Stone wool is an inert substrate made from molten rock, in particular basalt or "slag," that is spun into bundles of single-filament fibers, and bonded into a medium capable of capillary action. Stone wool is protected from most common microbiological degradation and can remain with the hybrid grass for its lifetime.

The term "hybrid grass" (also referred to as "hybrid turf" or "reinforced natural grass") as used herein is a product created by combining natural grass with synthetic reinforcing fibers. Hybrid turf is commonly used for stadium pitches and training pitches, e.g., for football, rugby, American football, golf, and baseball. Reinforced natural grass can also be used for events and concerts and for various landscaping applications. The synthetic fibers make the grass stronger and more resistant to damage.

The term "hybrid grass support structure" as used herein selectively refers to the part of hybrid grass that is not natural grass and that gives mechanical support and stability to the natural grass. The hybrid grass support structure according to embodiments of the invention comprises the synthetic fibers, a growth medium layer, and a stone wool layer and may comprise additional, optional layers and elements.

The term "growth medium" as used herein refers to a material that provides mechanical support for growing natural grass plants. The growth medium can be a single material or a mixture of different materials. The growth medium is preferably a loose, granular material that allows water to pass through the growth medium layer. For example, the growth medium according to embodiments of the invention can be sand, soil, organic or inorganic granules, and the like. In some embodiments, the growth medium also contains grass seed. In addition, or alternatively, the growth medium also contains various additives, such as fertilizers, fungicides, herbicides, zeolites, or combinations of two or more of the foregoing.

The term "tufting" as used herein is a process in which a fiber is inserted on a material layer such as a textile mesh or a layer of a particular material (in this case, the growth medium layer and/or stone wool layer or parts thereof). Tufting as such is an ancient technique for making warm garments, especially mittens. The fiber is integrated into the material such that a plurality of short U-shaped loops of extra yarn appear on one side (the lower side) of the material layer, and the two ends of each loop point toward and protrude to the other, upper side of the material layer. Usually, the tufted fibers form a regular array of "dots" on the surface of the material layer facing the lower side. The ends of the tufted fiber facing the upper side also form U-turns, because a single fiber is tufted multiple times into the material layer. The U-shaped loops on the upper side of the material layer are then cut. The cut fiber ends provide the synthetic fibers of the hybrid grass support structure. On the upper side, the cut ends of the fiber may be tied for security, although they need not be. The resulting hybrid grass support structure comprises the cut fiber ends facing the upper side of the material layer, whereby said cut fiber ends constitute the synthetic fibers of the support structure. When the natural grass plants that have germinated in between the synthetic fibers have reached their typical size, the synthetic fibers will provide mechanical support for the natural grass blades.

The term "injecting" as used herein is a process similar to tufting and comprises the insertion of a plurality of fibers into a material layer (e.g., a material layer as described above). In contrast to tufting, the fibers that are integrated into the injection process are short, in the range of 5 to 50 cm. The fiber is integrated into the material layer such that a single U-shaped loop per injected fiber is generated, whereby the two fiber ends of the loop on the upper side of the material layer do not form a loop and hence are not cut. In contrast to tufting, the injection process does not contain a step of cutting the loops on the upper side of the material layer. Furthermore, each individual fiber is integrated into the material layer only once and forms a single U-shaped loop.

The term "use site" as used herein is the place of actual use of the hybrid grass support structure, i.e., the location where the hybrid turf support structure is to be installed. For example, the use site can be a sports field or a particular region of a garden (e.g., for landscaping applications).

A "box" as used herein is a three-dimensional container. For example, a box can be a cuboid or cube-shaped container. A box typically has an opening at its upper side that allows objects to be put inside.

DETAILED DESCRIPTION OF THE EMBODIMENTS

Like-numbered elements in these figures are either equivalent elements or elements that perform the same function. Elements that have been discussed previously will not necessarily be discussed in later figures if the function is equivalent.

Figure 1:
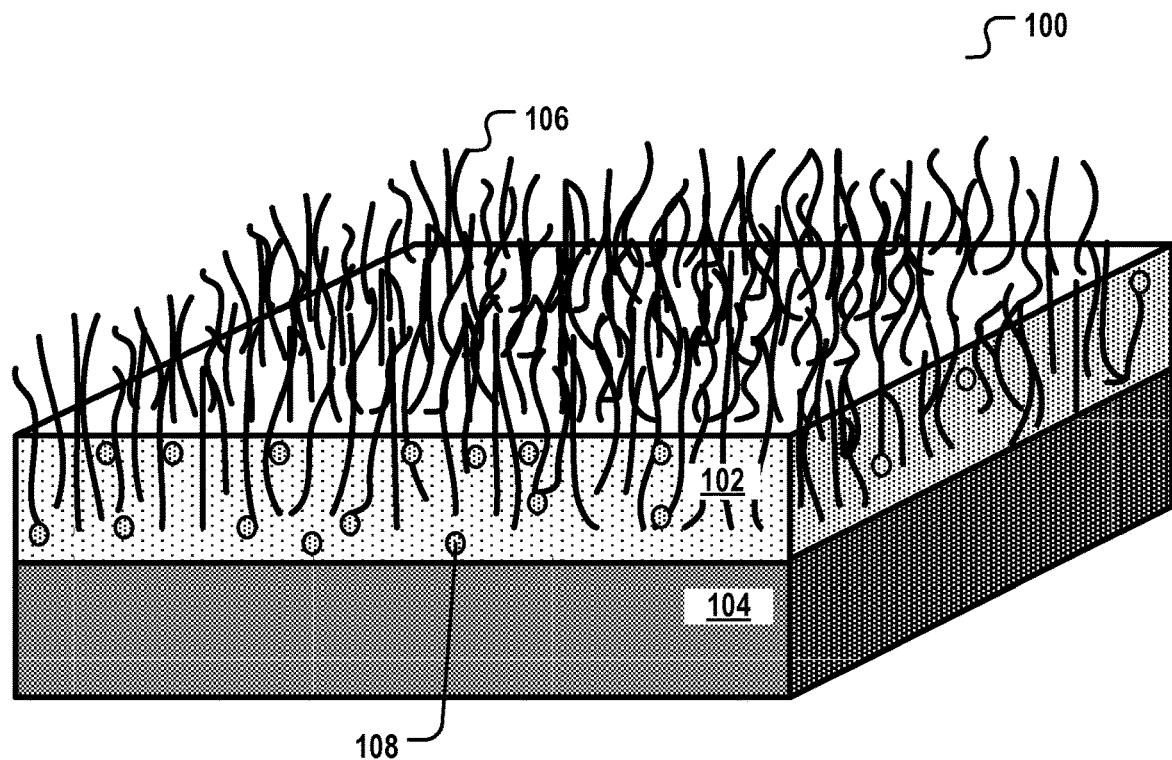
FIG. 1 shows a hybrid grass support structure.

FIG. 1 shows a hybrid grass support structure 100. It comprises at least a growth medium layer 102, a stone wool layer 104, and synthetic fibers 106. The growth medium layer comprises a growth medium, i.e., a medium allowing grass plants to grow roots in this medium. For example, the medium in the layer 102 can be sand, soil, organic granulate, or mixtures of two or more of the foregoing. The growth layer may in addition contain grass seed 108, fertilizers, fungicides, herbicides and further substances, which can be intermixed with and be homogeneously distributed within the growth medium as illustrated in FIG. 1 for the grass seed 108.

The stone wool layer is preferably positioned directly below the growth medium layer. This may ensure that capillary forces can soak water from the stone wool layer 104 into the growth medium layer 102 containing all or at least a significant portion of the roots of the natural grass plants that will be grown in the structure 100. Thereby, the system ensures that the roots are continuously provided with water that is stored in the stone wool layer, whereby the preferably granular structure of the growth medium ensures that no anaerobic conditions arise in the growth medium layer 102 that could cause a rotting of the roots.

Figure 2:
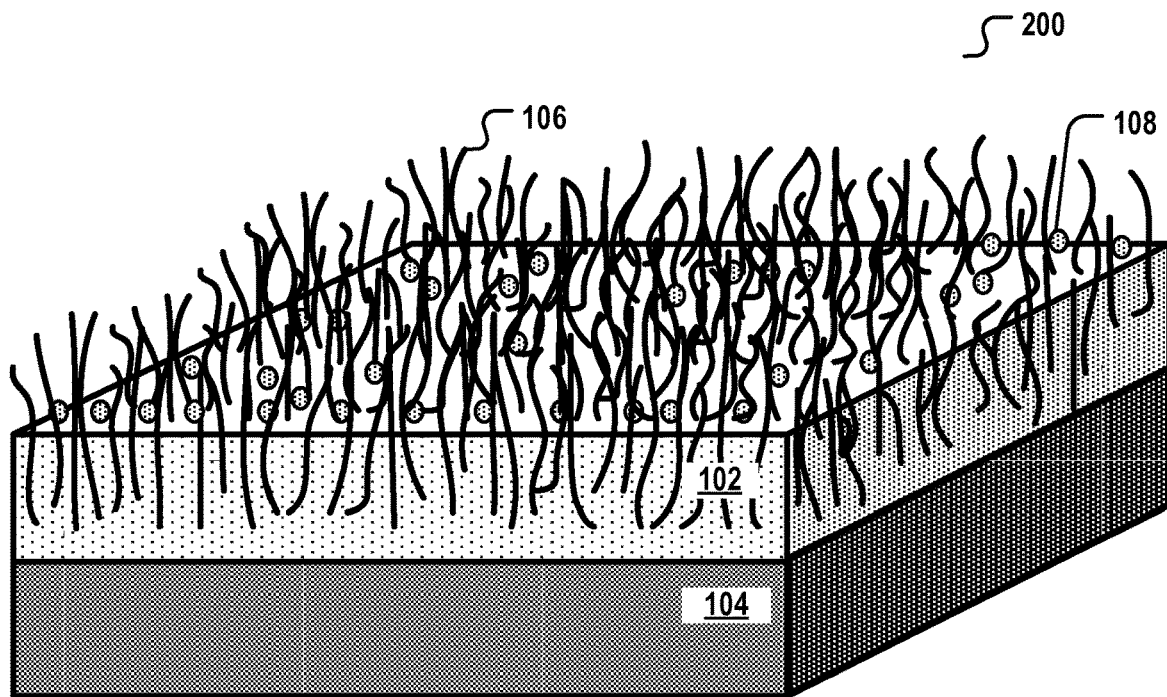
FIG. 2 shows another hybrid grass support structure.
Figure 3:
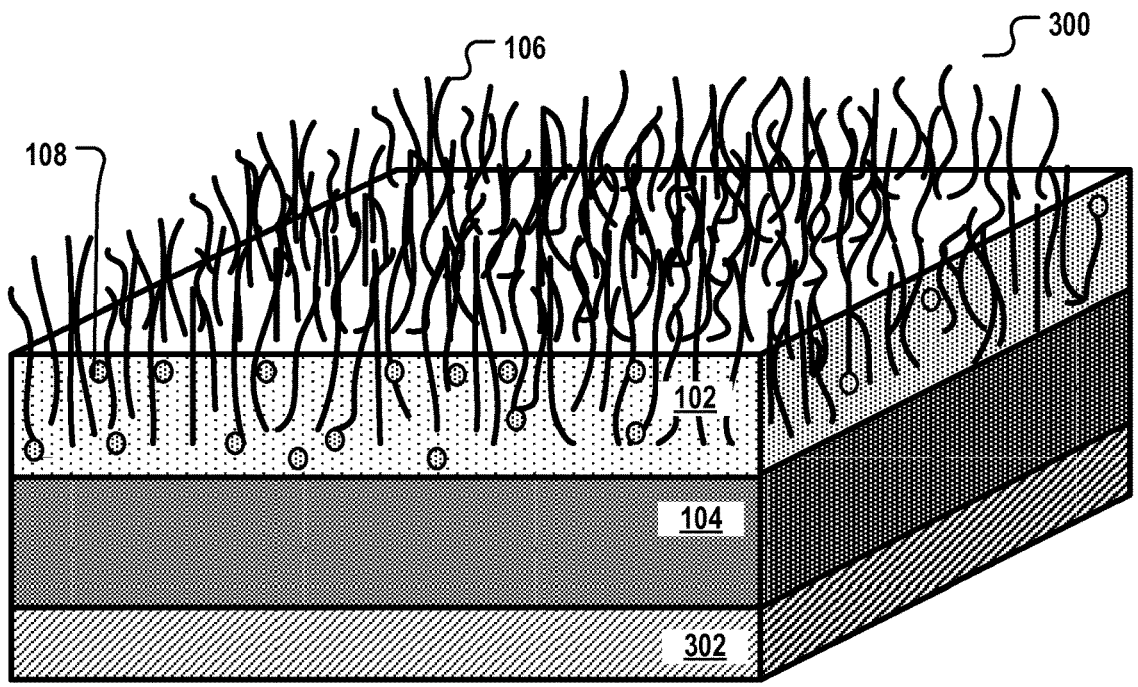
FIG. 3 shows a hybrid grass support structure with an elastic layer.

The plurality of synthetic grass fibers 106 are incorporated at least into the growth medium layer, as depicted in FIGS. 1, 2, and 3.

After installation of the support structure 100 at the use site, the structure is exposed to rain or is repeatedly irrigated. Grass roots are allowed to intertwine with the mix of growth medium and synthetic fibers as they grow.

Figure 4:
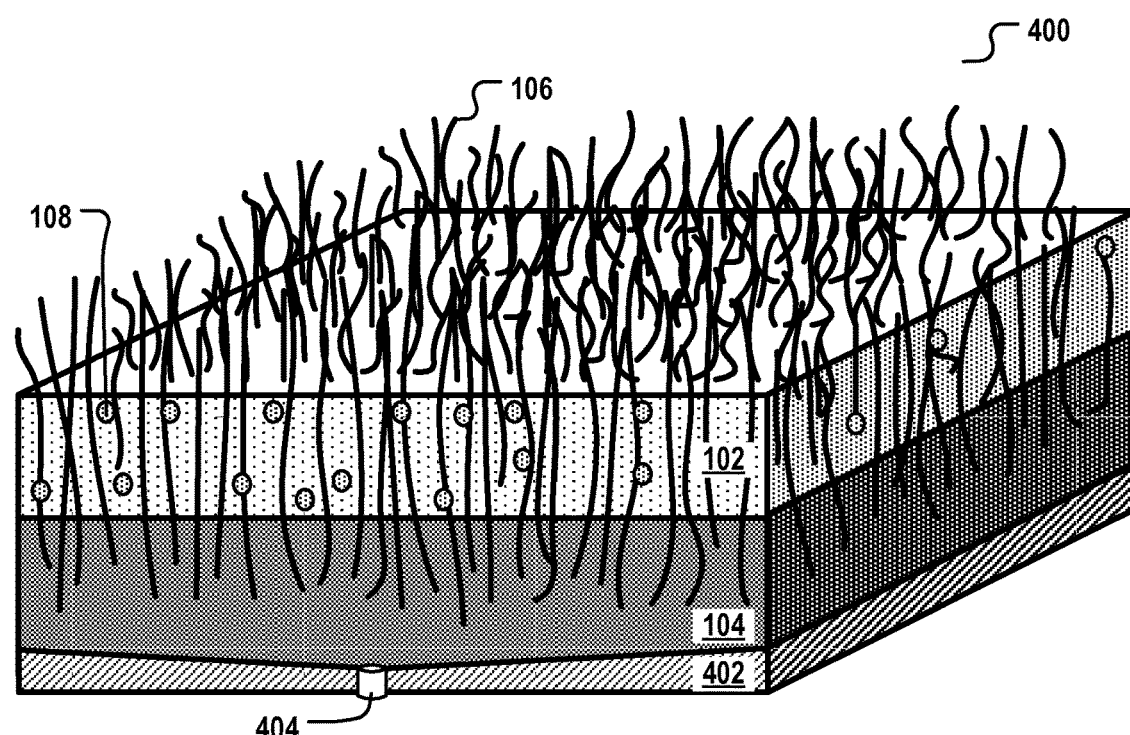
FIG. 4 shows a hybrid grass support structure with a drainage layer.
Figure 5:
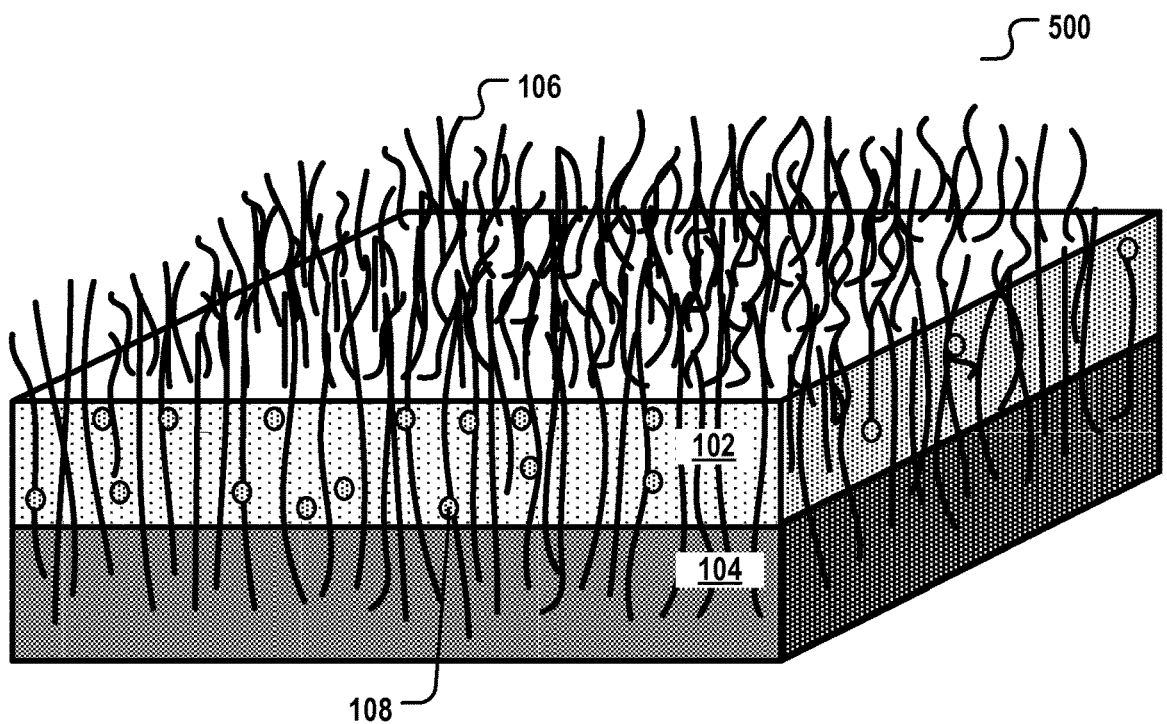
FIG. 5 shows a further hybrid grass support structure.
Figure 6:
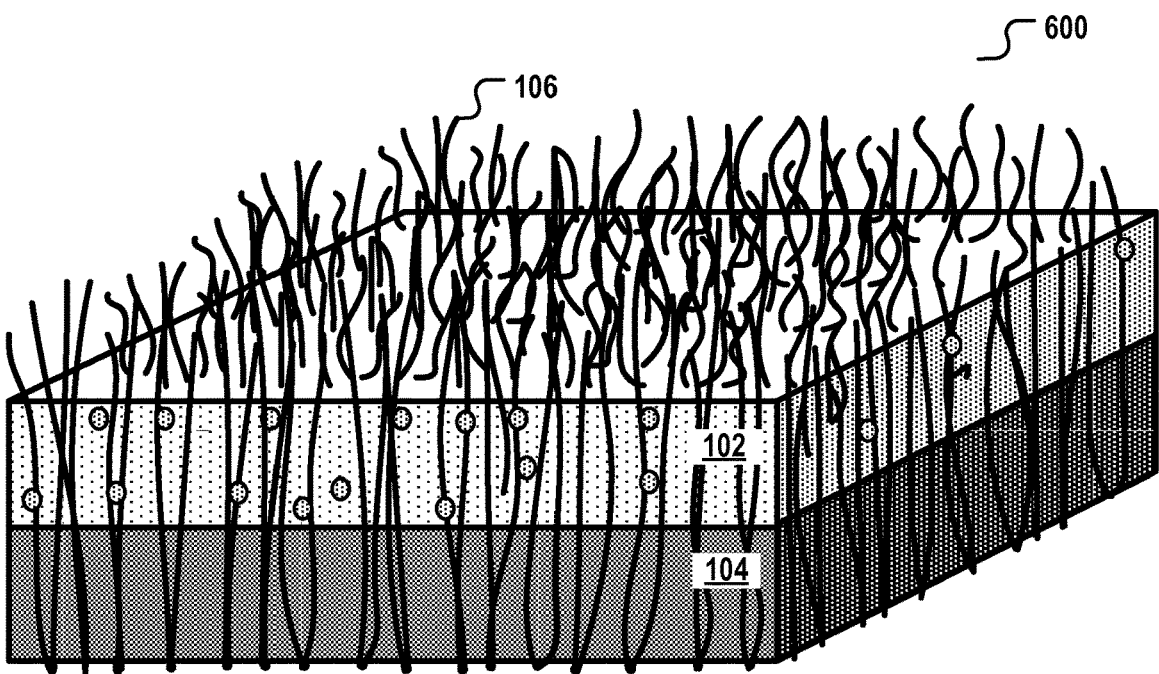
FIG. 6 shows another hybrid grass support structure.

Preferably, the fibers 106 are integrated in addition into at least a portion of the stone wool layer as depicted in FIGS. 4 and 5 or into the whole stone wool layer as depicted in FIG. 6. The higher the growth medium layer and the deeper the fibers are incorporated into the growth medium layer and optionally also the stone wool layer, the stronger the fibers are fixed into the hybrid grass support structure and the more robust the hybrid grass is against wear and tear induced by mechanical stress.

Various methods for integrating synthetic fibers into a hybrid grass support structure can be used.

According to some embodiments, the synthetic fibers 106 are injected into the growth medium by a fiber-injection machine. For example, the injection can be performed at a factory. However, this has the downside that the growth medium layer has to be transported to the use site. This increases transportation costs and complicates the installation. Therefore, the fiber injection is preferably performed at the use site by a mobile fiber-injection machine.

According to other embodiments, the fibers are tufted into the growth medium layer and optionally also the stone wool layer by a tufting machine. The tufting machine can be located at a plant, or it can be a mobile tufting machine used at the use site.

According to a further embodiment, the synthetic fibers and the growth medium are mixed in an automated plant and are installed afterward on the pitch. This process is known as Fibresand.

According to a further embodiment, the synthetic fibers are integrated into a mat, e.g., by tufting or weaving the fibers into the mat. Then, the mat is placed onto the stone wool layer and the growth medium is applied onto the mat and brushed in between the synthetic fibers afterward to keep the fibers in an upright position. The growth medium can be applied onto the mat at the plant or, alternatively, at the use site after installation of the stone wool layer and the mat, on the ground. Finally, the grass seed, which is already contained in the growth medium or is added later, is allowed to germinate and grow. The natural grass roots grow through the mat and stabilize the system.

Hence, in some embodiments, there are one or more additional material layers between the stone wool layer and the growth medium layer, e.g., a synthetic fiber mat having incorporated the synthetic fibers. Preferably, these additional layers are thin, preferably thinner than 0.5 cm, and are adapted to allow the soaking of water stored in the stone wool layer into the growth medium layer.

The stone wool layer is an elastic layer that is adapted to reduce the risk of injuries for players and ease maintenance for groundskeepers. Because of this, the hybrid grass support structure is preferably free of additional elements to enable softness.

The stone wool layer preferably has a height of at least 0.3 cm. For example, a stone wool layer having a height in the range of 3 to 10 cm, more preferably in the range of 5 to 10 cm, is adapted to store a sufficient amount of water to ensure a continuous water supply to the plant roots at typical irrigation rates, such as once a day, and in addition provides sufficient elasticity to minimize the risk on injuries of the joints of the players from injury.

FIG. 2 shows another hybrid grass support structure 200 that is similar to the structure 100 depicted in FIG. 1 and differs from the hybrid grass support structure 100 only in that the grass seed 108 is not intermixed with the growth medium but rather is added on top of the growth medium layer, e.g., before delivering the structure 200 to a customer or during or after installation of the structure 200 at the use site.

FIG. 3 shows a hybrid grass support structure 300 with an elastic layer 302, e.g., a layer consisting of an elastic mixture of a hardened, polyurethane-based binder and rubber granulate. Typically, thanks to the elasticity of the stone wool layer (and also to some degree of the growth medium layer), an additional elastic layer is not needed and is not part of the hybrid grass support structure. However, in application scenarios where a particularly high elasticity is required or where the height of the stone wool is small, e.g., less than 1 cm, an additional elastic layer may improve the elasticity of the artificial turf.

FIG. 4 shows a hybrid grass support structure 400 with a drainage layer 402. For example, the drainage layer can be a basic plane, such as a horizontal plastic plane (e.g., a polyethylene foil plane), containing one or more drainage openings 404. Alternatively, the drainage layer 402 can be a tilted plane or a layer comprising one or more "V"-shaped kinks that guides surplus water that cannot be absorbed and stored by the stone wool layer to the ground onto which the hybrid grass support structure is installed. In some embodiments, the ground where the hybrid grass support is installed contains a drainage system with multiple pipes, channels, and/or grooves, and the position of the drainage openings 404 and grooves in the drainage layer 402 and the position of the hybrid grass support structure on the ground of the use site are chosen such that the surplus water leaving the drainage openings or grooves of the drainage layer 402 enters the pipes, channels, and/or grooves of the drainage system of the installation ground. This may be advantageous, because the water (which is expensive in many regions of the world) leaving the drainage layer 402 can be reused and because formation of puddles and the rotting of the plant roots can be prevented.

Collecting and reusing the runoff water for irrigation may not only reduce water consumption and costs, it may also prevent the leaking of fertilizer into nearby rivers and lakes. Rather, the water leaving the drainage layer openings 404 is collected and reapplied to the hybrid turf.

FIG. 5 shows a further hybrid grass support structure 500. The structure 500 and also the structure 400 depicted in FIG. 4 differ from the support structures 100, 200, and 300 in that the synthetic fibers 106 are integrated also into the upper part of the stone wool layer. This may increase the robustness of the integrated fibers against tuft withdrawal forces and hence may increase the lifetime of the hybrid turf.

FIG. 6 shows a still further hybrid grass support structure 600. The fibers are incorporated into the growth medium layer 102 and the stone wool layer 104 completely. For example, the fibers can be tufted with a tufting needle through both layers 102, 104 such that U-turned portions of the fibers are visible at the lower side of the stone wool layer 104. This provides for a particularly firm fixing of the fibers in the support structure.

Figure 7A:
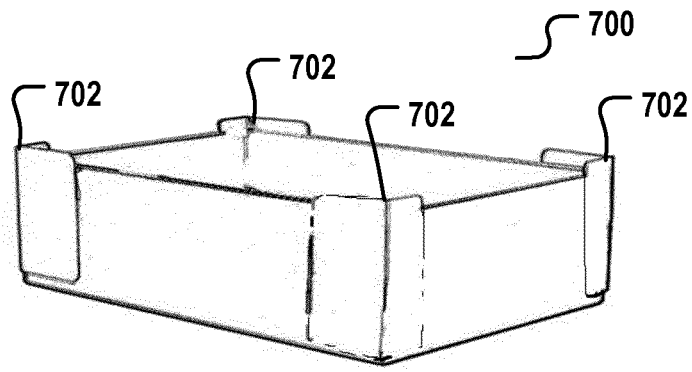
FIG. 7A shows a single biodegradable, stackable box.

FIG. 7A shows a single biodegradable, stackable box 700 according to an embodiment of the invention. The depicted box is made from biodegradable cardboard and comprises a stacking element 702 (often implemented as thickening element), at each corner that allows the stacking of multiple boxes on top of each other. Preferably, the box or its thickening elements are stiff and robust enough to allow the stacking of multiple empty as well as filled boxes, whereby a "filled box" is a box containing a piece of the hybrid turf support structure described herein for embodiments and examples of the invention.

Figure 7B:
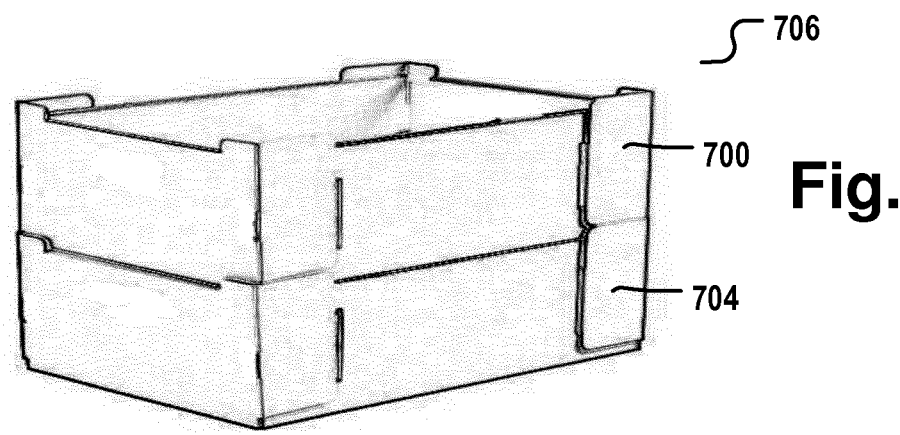
FIG. 7B shows a stack of two biodegradable boxes.

FIG. 7B shows a stack 706 of two biodegradable boxes 700, 704.

Figure 7C:
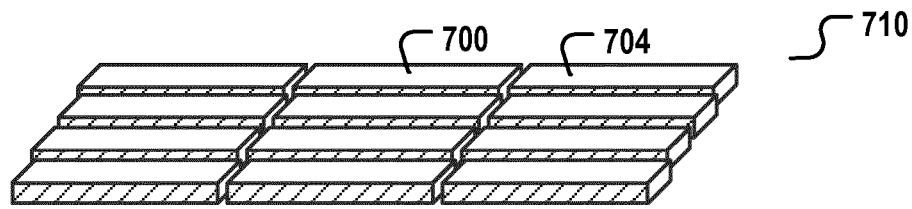
FIG. 7C shows a hybrid turf support structure formed by multiple boxes.

FIG. 7C shows a hybrid turf support structure 710 formed by multiple boxes. The boxes are simply put next to each other on the ground where the hybrid turf is to be installed. The gaps between the individual boxes are for illustration only. Preferably, the boxes are arranged on the ground such that the four outer sides of the boxes are in direct contact with the sides of the neighboring boxes. This may ensure that when the biodegradable boxes have been completely degraded and the natural grass plants have formed a natural lawn, the borders of the former boxes are no longer visible. Rather, a homogeneous, hybrid grass lawn is formed.

As mentioned above, the hybrid grass structure depicted in any one of FIGS. 1-6 or parts thereof (e.g., the stone wool layer and a mat comprising the fibers) can be manufactured at a plant and transported to and installed at the use site. Alternatively, the hybrid grass support structure can be fabricated directly at the use site, e.g., by applying the stone wool layer onto the ground first and then adding the growth medium layer and the fibers. Depending on the embodiment, additional components of the support structure (seeds, fertilizers, etc.) may be added before or during installation. According to preferred embodiments, the hybrid grass support structures as depicted, for example, in FIGS. 1-6 are manufactured at a plant in the form of comparatively small pieces ("tiles") of hybrid grass support. Each of said pieces is put into a biodegradable box, usually a stackable biodegradable box, e.g. a stackable cardboard box. The boxes with the hybrid grass support tiles are transported to the use site and installed by simply placing the boxes on the ground of the use site next to each other such that an area of box-based tiles is formed. The hybrid grass support tiles are not removed from their respective boxes for installation. Rather, the walls of the biodegradable box will degrade upon being repeatedly exposed to water.

Figure 8A:
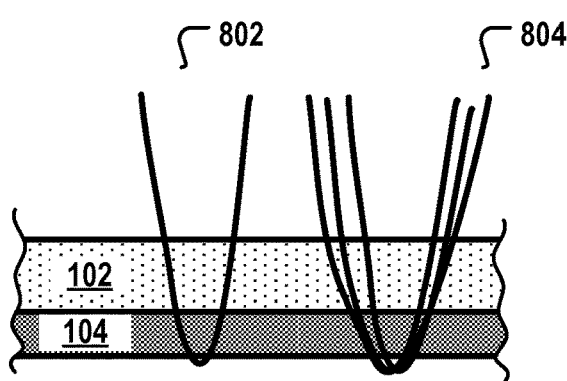
FIG. 8A depicts tufted fibers.

FIG. 8A is an illustration of a single fiber 802 and a bundle 804 of synthetic fibers having been integrated into the growth medium layer 102 and the stone wool layer 104 by a tufting needle. The U-shaped loops at the upper side of the layer 102 have been cut (not shown) into two respective fiber ends extending to the upper side of the growth medium layer 102. The U-shaped loops at the lower side of the stone wool layer 104 are still visible and may form rows of tufting knots.

Figure 8B:
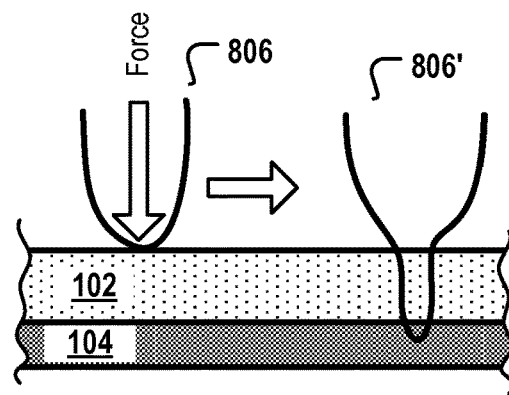
FIG. 8B is an illustration of a fiber-injection process.

FIG. 8B is an illustration of a fiber-injection process that integrates a single synthetic fiber 806 into the growth medium layer 102 and the upper part of the stone wool layer 104. A comparatively short fiber is positioned on the upper surface of the growth medium layer and is pressed by a needle-like object into the layers 102, 104. When the object is pulled back out of the layers 102, 104, the free space of the injection path is filled by the surrounding material, in particular the growth medium. As a result, the injected fiber 806' is mechanically fixed in the hybrid grass support structure.

Figure 9:
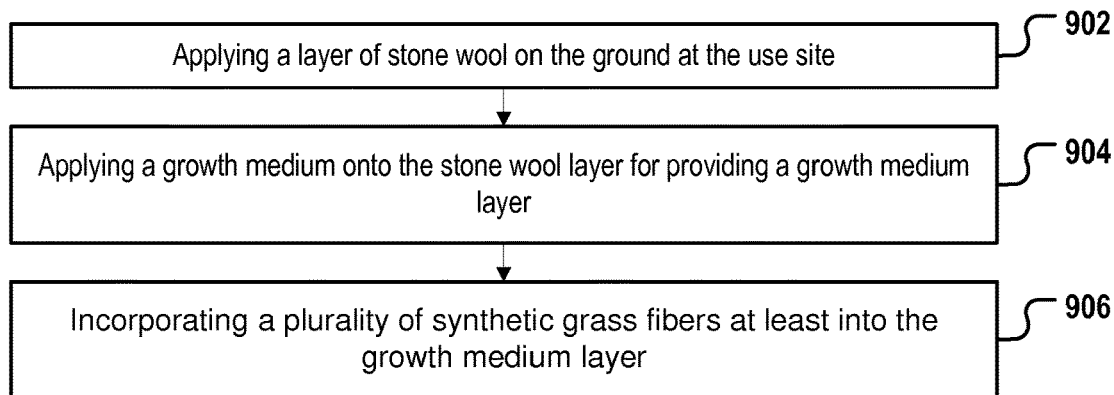
FIG. 9 is a flowchart of a method for installing a hybrid grass support structure.

FIG. 9 is a flowchart of a method for installing a hybrid grass support structure. The method depicted in FIG. 9 may be particularly advantageous for installing large hybrid turf structures, e.g., for a large soccer field.

First, in step 902, a layer of stone wool is applied on the ground where the hybrid turf support structure is to be installed. Thereby, a stone wool layer 104 is formed. For example, the stone wool can be provided in the form of rolls, which are unwound to form adjacent stone wool lanes. Alternatively, the stone wool can be provided in the form of tiles, which are placed on the ground such that neighboring tiles are in direct contact with each other. Preferably, the stone wool layer is applied onto ground that contains a drainage system.

Next, in step 904, the growth medium is applied on top of the stone wool layer, thereby forming the growth medium layer 102.

Next, in step 906, synthetic fibers 106 are incorporated at least into the growth medium layer 102 and optionally also into the stone wool layer 102. For example, a movable tufting machine or fiber-injection machine can be used for on-site incorporation of the fibers into the layered support structure.

In some embodiments, the fibers are applied before the growth medium. For example, a mat comprising the synthetic fibers can be placed directly on top of the stone wool layer. Then, the growth medium is added on top of the mat, whereby the added growth medium is moved and mixed with the fibers such that the fibers protrude from the growth medium and are not pressed down and covered by the growth medium.

Figure 10:
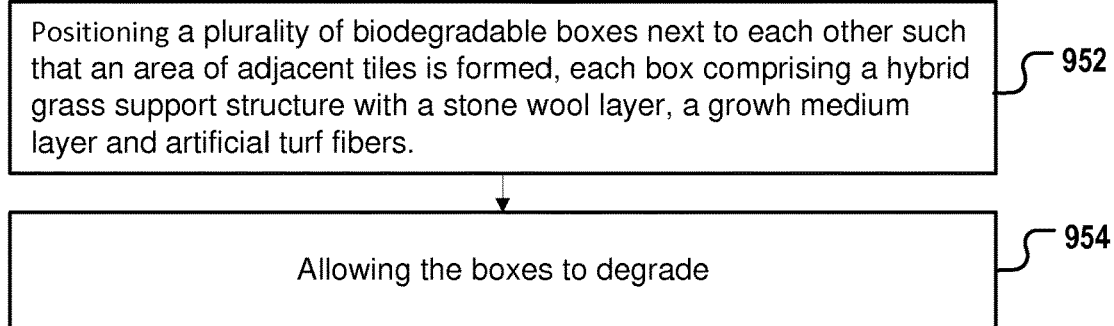
FIG. 10 is a flowchart of an alternative method for installing a hybrid grass support structure.

FIG. 10 is a flowchart of an alternative method for installing a hybrid grass support structure. This method is particularly beneficial for installing support structures on small areas of only a few square meters or on areas with an irregularly shaped outline. First, in step 952, a plurality of biodegradable boxes is provided, whereby each box contains a stone wool layer, a growth medium layer, and synthetic fibers. The boxes are positioned on the ground where the hybrid turf support is to be installed such that the edges of neighboring boxes directly contact each other. Next, in step 954, the boxes are allowed to degrade. For example, the boxes are repeatedly exposed to water, e.g., actively by irrigating the boxes or passively by exposing the boxes to rain. The water and the omnipresent microorganisms will induce the biodegradation of the boxes, and the water will allow the grass seed to germinate and grow. After a couple of weeks, the tiled area with the boxes will be transformed into a homogeneous area of hybrid grass.

Figure 11A:
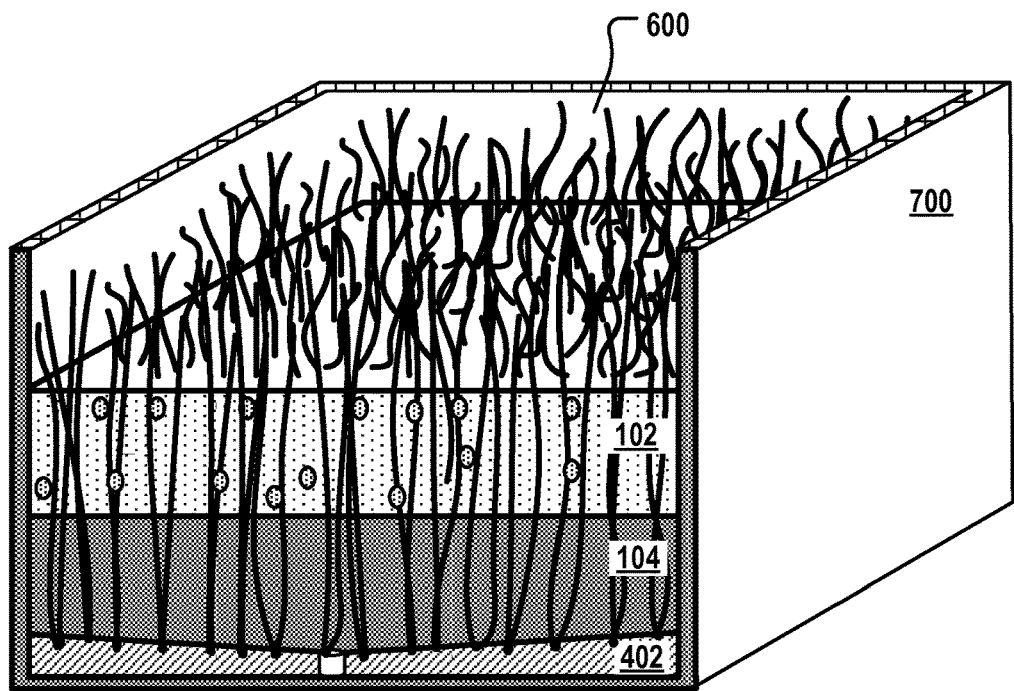
FIG. 11A depicts a box containing a hybrid grass support structure.

FIG. 11A depicts a box 700 comprising a hybrid grass support structure, e.g., the structure 600 depicted in FIG. 6. However, hybrid grass support structures according to any other embodiment of the invention may likewise be contained in the box. It is also possible that some elements of the support structure are not contained in the box when the box is delivered from the manufacturing plant to the customer at the use site. For example, the grass seed 108 may be added later by the customer, enabling the customer to freely choose the desired grass species.

Figure 11B:
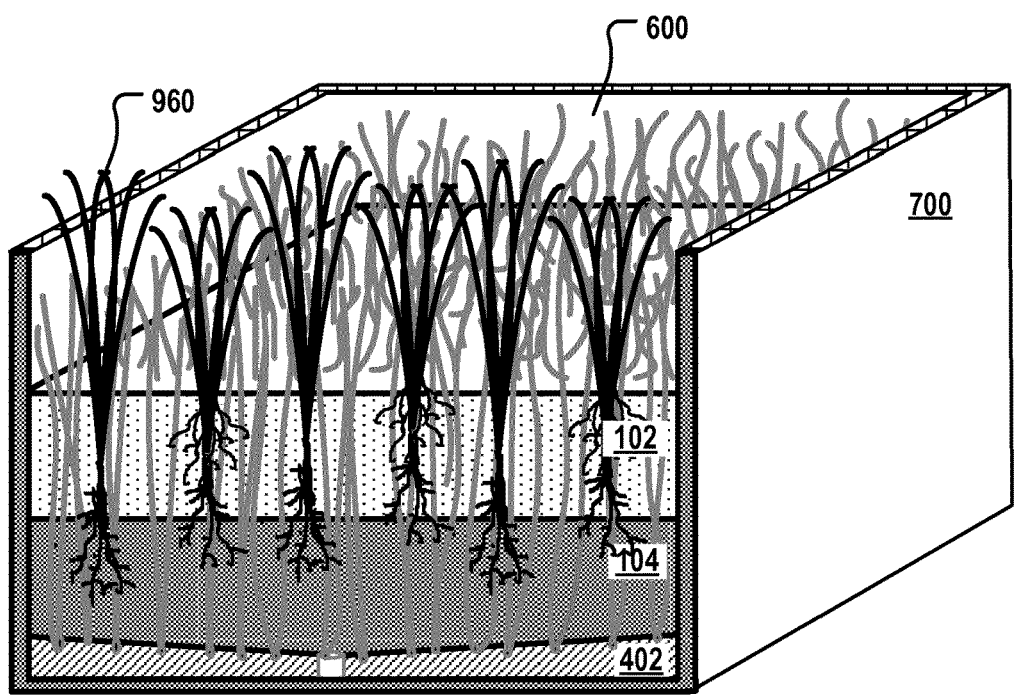
FIG. 11B depicts the box containing hybrid grass.

FIG. 11B depicts the box 700 containing hybrid grass. The hybrid grass comprises a mixture of synthetic fibers 108 and grass blades of natural grass plants 960. When the grass plants have grown to the same height as the synthetic fibers, the walls of the box are typically already partially or completely degraded (not shown).

LIST OF REFERENCE NUMERALS 100 hybrid grass support structure
102 growth medium layer
104 stone wool layer
106 synthetic fiber
108 grass seed
200 hybrid grass support structure
300 hybrid grass support structure
302 elastic layer
400 hybrid grass support structure
402 drainage layer
404 drainage opening
500 hybrid grass support structure
600 hybrid grass support structure
700 degradable box
702 stacking elements
704 degradable box
706 stack of two degradable boxes
710 tiled area made of multiple boxes
802 tufted single synthetic fiber
804 tufted bundle of multiple synthetic fibers
806 single synthetic fiber before injection
806' single synthetic fiber after injection
902-906 steps
952-954 steps
960 natural grass plant

What is claimed is:

1. A box made of a biodegradable material, the box comprising a hybrid grass support structure comprising:
    a growth medium layer, the growth medium layer comprising a growth medium selected from a group comprising sand, soil, an organic granulate, and a mixture of two or more of the foregoing;
    a stone wool layer positioned below the growth medium layer; and
    a plurality of synthetic grass fibers incorporated at least into the growth medium layer and also into the stone wool layer.

2. The box of claim 1, wherein the growth medium layer comprises grass seed.

3. The box of claim 1, wherein the growth medium layer comprises a binding agent.

4. The box of claim 1, wherein the biodegradable material comprises cardboard.

5. The box of claim 1, wherein the box has a base surface size smaller than 1 square meter.

6. A hybrid grass support structure comprising:
- a growth medium layer, the growth medium layer comprising a growth medium selected from a group comprising sand, soil, an organic granulate, and a mixture of two or more of the foregoing;
- a stone wool layer positioned below the growth medium layer; and
- a plurality of synthetic grass fibers incorporated at least into the growth medium layer and also into the stone wool layer.

7. The support structure of claim 6, wherein the growth medium layer comprises grass seed.

8. The support structure of claim 6, wherein the growth medium layer comprises a binding agent.

9. The support structure of claim 8, wherein the binding agent comprises a biodegradable, plant-based binding agent.

10. The support structure of claim 6, wherein the stone wool layer comprises basalt.

11. The support structure of claim 6, wherein the stone wool layer has a height of at least about 0.3 cm.

12. The support structure of claim 6, further comprising a drainage layer below the stone wool layer, the drainage layer comprising a perforated layer or a tilted layer.

13. The support structure of claim 6, wherein the growth medium layer has a height of less than about 6 cm.

* * * * *